United States Patent [19]

Cornwell et al.

[11] 4,088,808
[45] * May 9, 1978

[54] SHAPED ARTICLES OF HYDRAULIC CEMENT COMPOSITIONS WITH A GLOSSY REFLECTIVE SURFACE AND REINFORCED WITH FIBER GLASS

[76] Inventors: Charles E. Cornwell, 7104 Marlan Dr.; Mark Plunguian, 6912 Columbia Dr., both of Alexandria, Va. 22307

[*] Notice: The portion of the term of this patent subsequent to Nov. 30, 1993, has been disclaimed.

[21] Appl. No.: 718,522

[22] Filed: Aug. 30, 1976

Related U.S. Application Data

[63] Continuation-in-part of Ser. No. 649,895, Jan. 16, 1976, Pat. No. 4,036,839, which is a continuation-in-part of Ser. No. 591,095, Jun. 27, 1975, Pat. No. 3,995,086.

[51] Int. Cl.$^2$ .......................... B28B 1/16; B32B 5/18; B28B 1/20; B28B 7/34
[52] U.S. Cl. ..................................... 428/409; 106/99; 106/DIG. 1; 264/256; 264/258; 264/309; 264/311; 264/333; 264/338
[58] Field of Search .............. 264/338, 256, 257, 258, 264/309, 310, 311, 333, 337; 106/99, DIG. 1; 428/409

[56] References Cited
U.S. PATENT DOCUMENTS

3,995,086  11/1976  Plunglan et al. ................. 264/338 X

*Primary Examiner*—Thomas P. Pavelko

[57] ABSTRACT

Shaped articles of hydraulic cement compositions reinforced with fiber glass fabric or with chopped fiber glass, and having a smooth, reflective surface, are produced by the admixture of "super" water reducers to the aqueous cementitious slurries followed by casting or spraying into synthetic polymer molds, or molds coated with such synthetic polymers which are water repellent and non-sticking to hydraulic cements, to yield cured articles of high flexural strength with at least one surface which is an exact reproduction of the surface of the synthetic polymer mold, such as high gloss and patterned design. A great variety of useful articles may be produced, such as building panels, curtain walls, hollow utility poles and pipes, "raised" flooring panels, roofing tiles, protective barriers, and other products requiring thin shell, high flexural strength products for decorative and utilitarian uses.

7 Claims, No Drawings

SHAPED ARTICLES OF HYDRAULIC CEMENT COMPOSITIONS WITH A GLOSSY REFLECTIVE SURFACE AND REINFORCED WITH FIBER GLASS

CROSS REFERENCE TO RELATED APPLICATION

This application is a continuation-in-part to our co-pending application Ser. No. 649,895, filed Jan. 16, 1976, now U.S. Pat. No. 4,036,839; which in turn is a continuation-in-part of Ser. No. 591,095, filed June 27, 1975, now U.S. Pat. No. 3,995,086.

BACKGROUND OF THE INVENTION

A primary object of the invention is to provide a shaped article of hydraulic cementitious material with at least one smooth or textured reflective surface which is waterproof and has a high flexural strength, useful for decorative and utilitarian purposes, such as indoor and outdoor building panels, hollow utility poles and pipes, raised flooring panels, roofing tiles, and the like.

Another object of the invention is to provide a novel method for the production of shaped articles of cementitious material having a decorative and protective surface, and which is reinforced with fiber glass fabric and chopped fiber glass to yield products of high flexural strength.

SUMMARY OF THE INVENTION

Our application Ser. No. 649,895 describes a process for forming shaped articles with glossy, reflective surfaces by casting or spraying hydraulic cementitious compositions containing "super" water reducers, in molds of water-repellent, synthetic polymers, or molds which have been coated with such polymers which are naturally nonsticking to hydraulic cements. Such polymers are exemplified by polyethylene, polypropylene, polybutylene, polystyrene, polyacrylate, polyester, polyamide, epoxy, fluoroplastics, acrylonitrile-butadiene-styrene (ABS), and polyvinyl chloride and its copolymers. These polymers are self-releasing of cured hydraulic cements. Consequently, the surface of the synthetic polymer in the mold is reproduced exactly in the cured cementitious product. When the synthetic polymer surface is glossy, then the cured cementitious product is glossy and light reflective. When the surface of the polymer mold is mat, or of any textured design, then this exact surface is reproduced in the cured hydraulic cement. A cured cement product with a mat, non-glossy surface may be produced from a synthetic polymer with a glossy surface by first applying a thin coating of an oily release agent to the mold surface.

Examples of the "super" water reducers are as follows:

"Mighty" (ICI United States) composed of about 90% of a polymer of the sodium salt of naphthalene sulfonic acid partially condensed with formaldehyde, and about 10% sodium gluconate (U.S. Pat. No. 3,686,133). "Melment L-10" (American Admixtures) is similar to "Mighty" except that a melamine ring is used, instead of a naphthalene ring, in the polymer component. "Lomar D" (Diamond Shamrock) is identical to the 90% polymer component of "Mighty". "Fx 32" (Fox Industries) is a catalytic high early strength admixture for portland cement the addition of which will reduce the water content of workable cement slurries by 15–25%.

A highly reflective surface is obtained in a cured hydraulic cement when about 0.25–2.0%, based on the cement, of one of the above water reducers is admixed to the cementitious slurry, and this slurry is cast in a mold with a glossy surface of a synthetic polymer. It was also found to be advantageous to use a small amount of a cement retarder to the formulation, of the order of about 0.01 to about 0.25% based on the weight of cement. A great variety of curing retarders may be used, such as glycerine, cane sugar, citric acid, sodium citrate, sodium gluconate, boric acid, zinc oxide, glassy polyphosphate, iso-propyl alcohol, fly ash, and others.

The decorative surface of the cured cementitious composition may be produced in any color, by the addition to the formulation of color pigments which are chemically inactive in the presence of cement.

The process is applicable to any hydraulic cement, such as portland cement, calcium aluminate cement, and gypsum cement. The cementitious slurries may be produced by dispersing or dissolving each component in turn in the water, prior to casting or spraying these slurries in the synthetic polymer mold. A preferred procedure is to preblend all the dry components and any small percentage of a liquid component, for storage and shipment. This preblended material may then be mixed with the required amount of water prior to casting or spraying.

It has now been found that the above process of our application, Ser. No. 649,895, now U.S. Pat. No. 4,036,839 can be greatly improved and its usefulness extended by reinforcing the cementitious composition with fiber glass fabric or with chopped fiber glass to yield thin shell structures of high flexural strength, while still retaining the decorative and protective surface properties of the original invention.

The glass fiber may be the so-called "alkali resistant" type produced from a special glass melt containing for example zirconium oxide. The glass fiber can also be of the more common, less expensive, so-called "E" glass developed for its favorable electrical properties. E glass is not alkali resistant. It would therefore not be resistant to the highly alkaline portland cement. This alkalinity is due mainly to the production of calcium hydroxide during curing of the calcium silicates and other components of the cement. However, in the presence of pozzolonic fly ash, the lime reacts with the pozzolan, thus reducing the alkalinity and preventing the breakdown of the glass fiber. Another important factor in preserving the strength of E glass fiber consists in the use of the water reducers. Reducing the percentage of water, based on the portland cement, yields higher density, stronger concrete structures. This higher density greatly reduces the absorption of water and thus further reduces the chemical attack on the glass fibers.

DETAILED DESCRIPTION OF THE INVENTION

The following specific examples will further illustrate the practice of our invention.

EXAMPLE 1

The following four cement mortar compositions were mixed and cast into dumb-bell shaped molds. The components are given in parts by weight.

| Number | 1A | 1B | 1C | 1D |
| --- | --- | --- | --- | --- |
| Portland cement | 24.4 | 19.7 | 24.4 | 19.7 |

-continued

| Number | 1A | 1B | 1C | 1D |
|---|---|---|---|---|
| Pozzolonic fly ash | — | 3.7 | — | 3.7 |
| Lomar D water reducer | 0.15 | 0.15 | 0.15 | 0.15 |
| Sand | 63.35 | 64.2 | 62.55 | 63.4 |
| ⅜" E fiber glass | — | — | 0.8 | 0.8 |
| Water | 12.1 | 12.25 | 12.1 | 12.25 |
| Total | 100 | 100 | 100 | 100 |

The castings were cured for 28 days at room temperature. Some of the samples were then tested for tensile strength. The remaining samples were further treated by heating at 350° F in an autoclave for 7 hours, and then also tested for tensile strength, with the following results.

| Ex. No. | 28-Day Tensile Strength | Tensile Strength After Additional 7 Hours at 350° F | Percentage Change Based on Unheated Samples |
|---|---|---|---|
| 1A | 201 psi | 228 psi | + 13.4% |
| 1B | 189 psi | 310 psi | + 64.0% |
| 1C | 475 psi | 194 psi | − 59.2% |
| 1D | 417 psi | 877 psi | +110.3% |

Sample 1A shows that a small increase in strength is obtained by further curing at a higher temperature. Sample 1B shows that the substitution of part of the portland cement with fly ash retards the curing at first, but then with further curing surpasses the comparable sample without this additive. Sample 1C shows that the fiber glass at first increases the strength appreciably, but on heating, thus accelerating the aging process, all this added strength is lost, clearly indicating that the glass fiber had been destroyed. Sample 1D shows that in the presence of fly ash, upon further accelerated curing, the strengthening effect of the glass fiber is greatly increased over the already higher starting strength.

EXAMPLE 2

The following composition was mixed in a conventional mortar mixer for about five minutes: 38 pounds of water, 2 pounds Lomar D water reducer, one ounce glycerine, 94 pounds Type 1 portland cement, 28 pounds fly ash, one pound chromic oxide green and one pound cobalt blue, and 120 pounds sand. The mix was emptied into a hopper and pumped through 50 feet of ¾ inch hose to a spray gun. A series of 2×4 foot molds were fabricated from wood and lined with flat glossy polyacrylic sheeting. A thin coating of the cementitious material was sprayed over the entire surface of the plastic sheeting. A layer of 6×6 fiber glass scrim was placed over the wet sprayed surface. Another layer of cementitious material was sprayed over the fiber glass fabric. This procedure was repeated until the required layers of glass fabric was laid down and the desired panel thickness was built up. Three panels were prepared in this way, of about ¼, ⅜, and ½ inch thickness and containing respectively 2, 4 and 6 layers of glass fabric. The panels were cured at room temperature for 28 days. The bottom surfaces of the panels, in contact with the polyacrylic sheeting, were of a decorative, highly reflective, blue-green appearance. Sections of the panels were cut and tested for flexural strength, with the following results, each value being the average of six breaks:

| Example No. | Layers of Glass Scrim | Flexural Strength |
|---|---|---|
| 2A | 2 | 4800 psi |
| 2B | 4 | 5400 psi |
| 2C | 6 | 8000 psi |

The exceptional values of these strengths are evident when compared with non-reinforced conventional cement panels which have flexural strengths of about 280–400 psi.

EXAMPLE 3

A panel comparable to Example 2A was prepared from the same mix, with the only difference that the polyacrylic surface of the mold was first wiped over with a very thin layer of cement release oil. The panel thus produced after curing had a pleasing mat finish on the surface in contact with the polyacrylic sheeting.

EXAMPLE 4

A cement mix design was prepared as for Example 2. It was sprayed with the admixture of ¾ inch long chopped fiber glass by the use of a special spray gun in which the stream of cementitious material was split through a Y connection to two nozzles, while a chopper gun for fiber glass roving was mounted between the nozzles. This arrangement served to wet out the chopped fibers before they impinged on the surface of the mold, thus insuring that the fibers would be laid down uniformly. The mold was fabricated from a fiber glass-polyester resin composition, finished to a smooth glossy surface with a polyester gel coat. A layer of cementitious material was first sprayed unto the mold surface. The fiber glass chopper gun was then activated and a layer of ¾ inch long chopped glass fiber and cement slurry was then sprayed. This alternate spraying was continued until about 3% of chopped glass (on the basis of the weight of cement) was introduced and the panel thickness was built up to about ⅜ inch. Upon curing for 28 days, a panel with a glossy surface was obtained. It had a flexural strength of 3525 psi.

EXAMPLE 6

A test panel was made with our reinforced cementitious composition for use as raised, or access flooring. This type of flooring is generally associated with the location of computers. The floor is raised about 8–10 inches by means of 2×2 foot panels resting on adjustable jacks placed at each corner where four panels meet. The individual panels can be readily removed to give access to the computer wiring. The panels currently in use are fabricated of steel. The top surface normally has linoleum or carpet glued to the flat steel surface. The steel panels are costly. They also have other disadvantages, such as adverse electrical effects on the computer operation, and excessive expansion and contraction.

Our reinforced panels are less costly, are fireproof, and don't have the other disadvantages associated with steel panels. These advantages would permit the use of such raised flooring in any high rise building. It would be less expensive and safer to raise the floor and place all utility and service lines under the floor for full and ready access, rather than hang these lines under a false ceiling. The air plenum chamber under the floor could itself be used in place of a duct for air conditioning and heating.

Using the cementitious composition of Example 5 and the technique described for Example 2, a panel was sprayed inside a 2×2 foot rim of one inch steel angle iron, resting on a sheet of glossy polyacrylic plastic. Three layers of 4×4 glass fiber fabric was laid down and the panel built up to ½ inch in thickness. After curing for 28 days, a floor panel was obtained with a decorative surface and a supporting strength of 1000 psi, placed anywhere on the surface with less than ⅛ inch deflection.

EXAMPLE 7

Another very important application for the reinforced cementitious products of our invention is in the fabrication of hollow utility poles and pipes. This is done by spin casting in a split mold. The mold is lined with glossy polyacrylic sheeting, or is coated with self-releasing polymer resin. The circular mold is power driven on rollers at a suitable rpm. A thin coating of the cementitious material, in color if desired, is sprayed on the interior surface while the mold is revolving. Fiber glass fabric is then inserted so that the centrifugal force of the rotating mold causes the glass fabric to expand and adhere to the cementitious coating on the surface. Chopped fiber glass can also be introduced into the composition in the manner described in Example 4. These steps of spraying and inserting layers of glass fabric are repeated until the predetermined wall thickness and strength are obtained. The unit is allowed to cure, until it has sufficient strength to be removed from the split mold. It is then further cured to full strength, such as by floating in water.

A cylinder was prepared in the manner described above using the cementitious composition of Example 5. It had three layers of 6×6 fiber glass fabric. Test results by an independent laboratory showed a wall thickness of 0.4375 inches, a compressive strength of over 7000 psi and a flexural strength of over 6000 psi in 14 days.

These results may be compared to a solid wooden pole 45 feet long, with an average 12 inch diameter. Such a pole weighs an average of 1950 pounds. Our reinforced cementitious pole with comparable size would weigh under 1550 pounds, with equal or greater strength. It is also verminproof and fireproof and can be produced in any color with either a glossy or a mat finish.

EXAMPLE 8

Another application for the glass fiber reinforced cementitious composition is in the production of burial vaults. Our thin shell fiber glass reinforced burial vault weighs about 180 pounds, compared to the standard concrete vault weighing 850-1000 pounds. The lighter weight eliminates the need for the use of a crane for placing the vault in the ground. The burial vault can be sprayed up on a male mold of fiber-reinforced polyester resin to give a smooth, glossy finish on the inside of the vault ready for placing of the casket.

There are, no doubt, many other applications for these reinforced cementitious products. We wish to encompass all such applications as come within the scope of the appended claims.

We claim:

1. An improved shaped article with a reflective glossy surface comprising a composition of about 100 parts hydraulic cement selected from the group of portland cement, calcium aluminate cement, and gypsum cement, 10-400 parts aggregate, 0.25-2.0 parts water reducer selected from the group of polymers consisting of the alkali metal salts of melamine sulfonic acid partially condensed with formaldehyde, the alkali metal salt of naphthalene-sulfonic acid partially condensed with formaldehyde, and about 30-90 percent of the alkali metal salt of a high molecular weight condensation product of naphthalene-sulfonic acid and the balance 70-10 percent being the alkali metal salt of gluconic acid, 0.01-0.25 parts curing retarder, and 0-10 parts color pigments, all in parts by weight wherein the improvement comprises the inclusion of 10-30 parts by weight of pozzolanic fly ash and reinforcing fiber glass fabric or chopped fiber glass.

2. An improved method for producing a shaped article with a reflective glossy surface comprising the steps of dispersing in water about 100 parts by weight of an hydraulic cement selected from the group of portland cement, calcium aluminate cement, and gypsum cement, 10-400 parts aggregate, 0.25-2.0 parts water reducer selected from the group of polymers consisting of the alkali metal salts of melamine sulfonic acid partially condensed with formaldehyde, the alkali metal salt of naphthalene-sulfonic acid partially condensed with formaldehyde, and about 30-90 percent of the alkali metal salt of a higher molecular weight condensation product of naphthalene-sulfonic acid and the balance 70-10 percent being the alkali metal salt of gluconic acid, 0.01-0.25 parts curing retarder, and 0-10 parts color pigments, all in parts by weight, where the improvement comprises the steps of adding 10-30 parts by weight of pozzolanic fly ash to the cementitious composition, casting or spraying the dispersion thus formed into a synthetic polymer mold with a glossy water-repellent surface, or a mold coated with synthetic polymer, said polymer being selected from the group comprising polystyrene, polyethylene, polypropylene, polybutylene, polyacrylate, polyester, polyamide, epoxy, fluoroplastic, acrylonitrile-butadiene-styrene, and polyvinyl chloride and its copolymers, spraying a coating of the cementitious material on the mold surface, then incorporating in said mold reinforcing fiber glass fabric or chopped fiber glass and filling the mold with additional cementitious material, curing the composite material, and then removing the reinforced casting from the mold.

3. An improved method for producing a reinforced shaped article according to claim 2 wherein the mold with the glossy synthetic polymer surface is shaped to produce building panels, wall tiles, and roofing tiles, the cementitious composition is used to fill the mold, cured, and the reinforced material with at least one reflective, glossy surface is removed from the mold.

4. An improved method for producing a reinforced shaped article according to claim 2, wherein the cementitious composition is sprayed or cast into a mold comprising a rectangular rim of angle iron resting on glossy synthetic polymer sheeting. The cementitious composition is reinforced with fiber glass fabric or chopped fiber glass, the mold is filled, screeded and cured, whereby the angle iron rim becomes part of the finished floor panel.

5. An improved method for producing reinforced shaped articles according to claim 2, comprising the steps of spin casting by spraying the cementitious composition into a revolving split circular mold lined or coated with glossy synthetic polymer, the cementitious composition is reinforced with fiber glass fabric or chopped fiber glass, the composition is sprayed to the desired wall thickness, the hollow cylindrical casting is cured and removed from the mold to produce hollow utility poles and pipes with a glossy decorative and protective surface.

6. An improved method for producing a reinforced shaped article according to claim 2 wherein a deep mold is coated with a water-repellent synthetic polymer, the cementitious composition is sprayed on the walls of the mold, reinforced with fiber glass fabric or chopped fiber glass, the cementitious composition is built up to the desired thickness, the casting is cured, and removed from the mold to yield a thin shell burial vault with a glossy surface.

7. An improved method of producing a reinforced shaped article according to claim 2, wherein the synthetic polymer surface is coated with a thin film of cement-releasing, forming oil to yield a mat finish on the surface of the cured cementitious product.

* * * * *